Sept. 29, 1970      G. HÖHNE      3,531,671

INDUCTOR-TYPE SIGNAL GENERATOR

Filed July 29, 1968

INVENTOR
Gerd HÖHNE

United States Patent Office 3,531,671
Patented Sept. 29, 1970

3,531,671
INDUCTOR-TYPE SIGNAL GENERATOR
Gerd Höhne, Ludwigsburg, Germany, assignor to Robert Bosch GmbH, Stuttgart, Germany
Filed July 29, 1968, Ser. No. 748,356
Claims priority, application Germany, Aug. 12, 1967,
B 93,949
Int. Cl. H02k 17/42
U.S. Cl. 310—168
10 Claims

ABSTRACT OF THE DISCLOSURE

A signal generator having a cylindrical permanent magnet one pole of which is connected with a first section of a ferromagnetic stator. A second section of the stator has four equidistant pole shoes and is separated from the first section by a semiconductor, such as a Hall effect generator. The crankshaft of an internal combustion engine drives a ferromagnetic rotor which is adjacent to the other pole of the magnet and has equidistant pole shoes which travel seriatim past successive pole shoes of the stator. The electrical resistance of the semiconductor changes abruptly when the pole shoes of the rotor register with the pole shoes of the stator.

BACKGROUND OF THE INVENTION

The present invention relates to signal generators in general, and more particularly to improvements in signal generators which can be utilized in ignition systems of internal combustion engines to time the generation of sparks. Still more particularly, the invention relates to improvements in signal generators of the type wherein a semiconductor is placed into a magnetic field so that its characteristics change in response to changes of the magnetic field and wherein the magnetic field changes in response to rotation of a rotor.

Conventional signal generators of the just outlined character are normally coupled with a rotary part and their purpose is to initiate operations in predetermined angular positions of the rotary part. The principle underlying the operation of such signal generators is that the number of magnetic force lines in a magnetic field increases when the pole shoes of a rotor travel past the pole shoes of a stator whereby the electrical resistance of a semiconductor changes as a function of changes in the magnetic field. For example, the resistance of the semiconductor can rise to such a value that the semiconductor practically interrupts the flow of current in an electric circuit. Alternatively, the semiconductor can be connected in circuit with one or more transistors which can complete or open one or more electric circuits in dependency on the resistance of the semiconductor. This is of advantage because the circuit or circuits can be energized or de-energized without resorting to mechanical switches which undergo wear, whose contacts are likely to be contaminated and which are too slow for certain applications.

It is also known to employ the above outlined signal generators in the ignition systems of internal combustion engines wherein the signal generators initiate the firing of spark plugs. The stator of such a signal generator has a pole shoe whose end face carries a semiconductor. In order to obtain a satisfactory signal, the gap between the semiconductor and the pole shoe of the rotor is very narrow so that any foreign matter which enters or is entrained into such gap is likely to damage the semiconductor or to tear it away from the pole shoe of the stator. Moreover, the stator, rotor and semiconductor must be machined and mounted with utmost precision which contributes to the cost of the signal generator.

SUMMARY OF THE INVENTION

It is an object of my invention to provide a signal generator which avoids the drawbacks of aforementioned conventional signal generators.

Another object of the invention is to provide a signal generator wherein the stator and the rotor need not be machined or otherwise finished to close tolerances.

The signal generator comprises a permanent magnet or an electromagnet, a ferromagnetic stator member adjacent to or connected with one pole of the magnet, a ferromagnetic rotor member adjacent to the other pole of the magnet, a plurality of pole shoes provided on each of the two members in such an array that the pole shoes of the rotor member travel seriatim past successive pole shoes of the stator member when the rotor member is driven, for example, by the crankshaft of an internal combustion engine, and a semiconductor (e.g., a magnetically controllable resistor or a Hall effect generator) installed in one of the members between the respective pole and the corresponding pole shoes.

The novel features which are considered as characteristic of the invention are set forth in particular in the appended claims. The improved signal generator itself, however, both as to its construction and its mode of operation, together with additional features and advantages thereof, will be best understood upon perusal of the following detailed description of certain specific embodiments wtih reference to the accompanying drawing.

DESCRIPTION OF THE PREFERRED EMBODIMENTS

Figure 1:
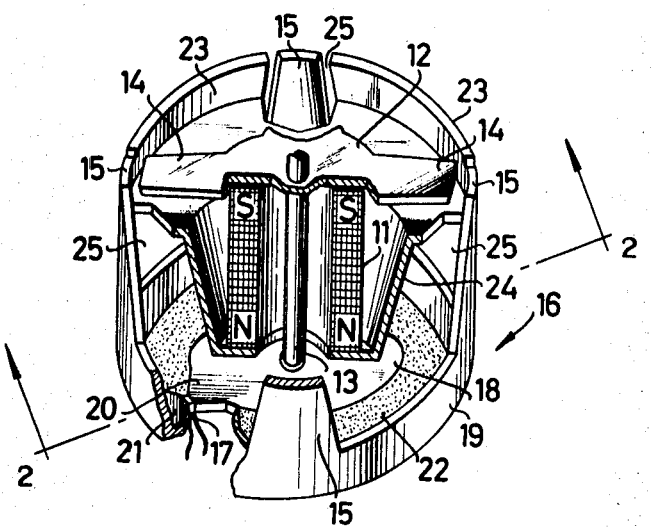
FIG. 1 is a perspective view of a signal generator which embodies one form of the invention, certain parts of the signal generator being shown in section or broken away.

Then signal generator of FIG. 1 comprises a tubular permanent magnet 11 which is a hollow cylinder and whose poles are disposed at its axial ends. The south pole is adjacent to but slightly spaced from a ferromagnetic rotor 12 which is affixed to a driving shaft 13 of diamagnetic material. In the illustrated embodiment, the rotor 12 has four equidistant radially extending pole shoes 14 (two shown in FIG. 1). When the shaft 13 rotates, the pole shoes 14 travel past four equidistant pole shoes 15 of a ferromagnetic stator or yoke 16. The latter is influenced by the north pole of the magnet 11. Starting from the north pole of the magnet 11, the magnetic lines of force pass through a semiconductor 17 and on to the pole shoes 15. This is of advantage because, when each of the pole shoes 14 registers with one of the pole shoes 15, the magnetic flux through the semiconductor 17 is the sum of fluxes between the pole shoes 15 and the registering pole shoes 14. Therefore, the pole shoes 14 and 15 can be separated by relatively wide air gaps.

In FIG. 1, the stator 16 comprises two ferromagnetic sections 18 and 19 the former of which is conductively connected to the north pole of the magnet 11 and simultaneously serves as a bearing for the driving shaft 13. The section 19 carries the pole shoes 15. The sections 18, 19 are respectively provided with projections 20, 21 having adjacent surfaces whose area approximates the maximum surface of the semiconductor 17. The semiconductor 17 is installed between such surfaces of the projections 20, 21. If desired, the sections 18, 19 can be rigidly coupled to each other by a connector 22 of diamagnetic material.

Figure 2:
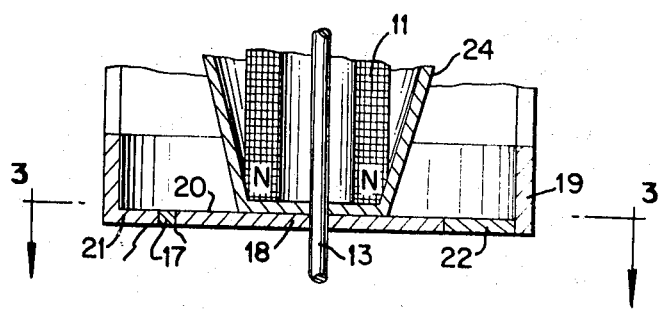
FIG. 2 is a fragmentary sectional view taken along the line 2—2 of FIG. 1.
Figure 3:
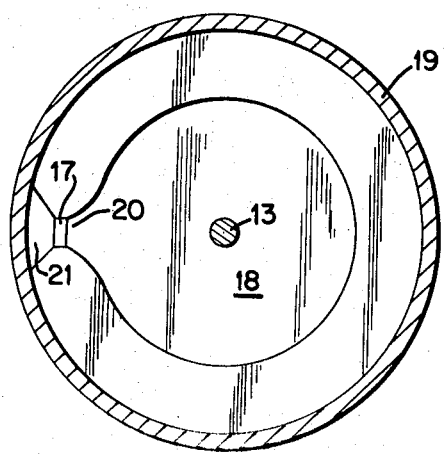
FIG. 3 is a sectional view taken along the line 3—3 of FIG. 2.

FIG. 2 illustrates a portion of a modified signal generator wherein the projections 120, 121 of the stator sections 118, 119 extend in the axial direction of the magnet 111 and wherein the connector 22 of FIG. 1 is omitted. The semiconductor 117 is mounted between the surfaces of the projections 120, 121. Such mounting of the semiconductor contributes somewhat to the height or length of the signal generator.

Referring again to FIG. 1, the shaft 13 is driven by a prime mover (not shown), for example, by the crankshaft of an internal combustion engine. The signal generator triggers or initiates an operation whenever the shaft 13 assumes a predetermined angular position during each of its revolutions. Such operation is triggered when each pole shoe 14 registers with a pole shoe 15 to thereby change the electrical resistance of the semiconductor 17 which thus initiates the desired operation. As stated before, the semiconductor 17 can initiate the ignition of fuel in the cylinders of the internal combustion engine whose crankshaft drives the shaft 13. In order to effect a very sudden change in resistance of the semiconductor 17, the signal generator preferably comprises auxiliary pole shoes 23 which are disposed between and alternate with the pole shoes 15 of the stator 16. The auxiliary pole shoes 23 are magntically connected to the north pole of the magnet 11 and are provided on a cupped carrier 24 which accommodates the magnet 11 and whose bottom wall is in contact with the north pole. The carrier 24 is formed with cutouts or recesses 25 which accommodate the pole shoes 15 in such a way that these pole shoes do not contact the carrier. The latter insures that stray magnetic fields cannot cause a substantial change in the resistance of the semiconductor 17 when the revolving pole shoes 14 approach the pole shoes 15.

It is clear that the permanent magnet 11 or 111 can be replaced with an electromagnet. The parts 12, 16 and 24 may consist of one piece of metallic material or each thereof may consist of a stack of laminations. The semiconductor 17 or 117 is preferably a Hall effect generator or a magnetically controllable resistor.

In accordance with a modification of the signal generator shown in FIG. 1, the position of the poles on the magnet 11 can be reversed. Furthermore, the semiconductor 17 can be installed in the rotor 12 so that the magnetic circuit branches out to the pole shoes 14. In such signal generators, the rotor 12 is replaced by a two-piece rotor whose sections are separated by the semiconductor 17. The stator 16 is then replaced by a single piece of magnetizable material.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

What is claimed is:

1. A signal generator comprising a magnet; a ferromagnetic stator member connected with one pole of said magnet; a ferromagnetic rotor member adjacent to the other pole of said magnet, each of said members having a plurality of pole shoes and the pole shoes of said rotor member being arranged to travel past the pole shoes of said stator member separated by an air gap therefrom; and a magnetically controllable semiconductor installed in one of said members distant from said air gap in such a manner that the magnetic flux emanating from one pole of said magnet passes first through said semiconductor before being branched out into the pole shoes of said one member to then flow from these pole shoes through the air gap and the pole shoes of the other member to the other pole of said magnet.

2. A signal generator as defined in claim 1, wherein said semiconductor is installed in the magnetic flux between said one pole and the pole shoes of said stator member.

3. A signal generator as defined in claim 2, wherein said one member comprises two ferromagnetic sections one of which is adjacent to the respective pole and the other of which is provided with the respective pole shoes, said semiconductor being disposed between said sections.

4. A signal generator as defined in claim 3, wherein said sections have adjacent but spaced projections flanking said semiconductor.

5. A signal generator as defined in claim 3, further comprising a diamagnetic connector securing said sections to each other.

6. A signal generator as defined in claim 5, wherein said one member is said stator member.

7. A signal generator as defined in claim 1, further comprising auxiliary pole shoes alternating with the pole shoes of said one member and connected with said one pole of said magnet.

8. A signal generator as defined in claim 7, further comprising a carrier integral with said auxiliary pole shoes and supportingly connected with said magnet.

9. A signal generator as defined in claim 8, wherein said carrier is a cup and is provided with cutouts accommodating the pole shoes of said one member in such a way that the last mentioned pole shoes are out of contact with said auxiliary pole shoes.

10. A signal generator as defined in claim 1, wherein each of said members comprises the same number of equidistant pole shoes and wherein each pole shoe of said rotor member registers with one pole shoe of said stator member when a single pole shoe of the rotor member registers with a pole shoe of the stator member.

References Cited

UNITED STATES PATENTS

| | | | |
|---|---|---|---|
| 2,512,325 | 6/1950 | Hansen | 310—68 |
| 2,624,017 | 12/1952 | Putnocky | 310—46 |
| 2,947,933 | 8/1960 | Davis | 310—171 |
| 2,986,686 | 5/1961 | Clifford | 310—46 |
| 3,248,584 | 4/1966 | Knaver | 310—171 |

WARREN E. RAY, Primary Examiner

R. SKUDY, Assistant Examiner

U.S. Cl. X.R.

310—68